(12) United States Patent
Lin et al.

(10) Patent No.: US 8,108,254 B2
(45) Date of Patent: Jan. 31, 2012

(54) METHODS TO ATTRIBUTE CONVERSIONS FOR ONLINE ADVERTISEMENT CAMPAIGNS

(75) Inventors: Long-Ji Lin, San Jose, CA (US); Dz-Mou Jung, San Jose, CA (US); Olga L. Natkovich, Sunnyvale, CA (US); Georgiy Goldenberg, Foster City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2300 days.

(21) Appl. No.: 10/879,457

(22) Filed: Jun. 29, 2004

(65) Prior Publication Data

US 2005/0071218 A1 Mar. 31, 2005

Related U.S. Application Data

(60) Provisional application No. 60/483,800, filed on Jun. 30, 2003.

(51) Int. Cl.
*G06Q 30/00* (2006.01)
(52) U.S. Cl. ............... 705/14.41; 705/14.45; 705/14.52; 705/14.68
(58) Field of Classification Search .............. 705/14
See application file for complete search history.

(56) References Cited

U.S. PATENT DOCUMENTS

| | | | |
|---|---|---|---|
| 5,974,396 A | 10/1999 | Anderson et al. | |
| 6,286,005 B1 | 9/2001 | Cannon | |
| 6,334,110 B1 | 12/2001 | Walter et al. | |
| 6,708,156 B1 | 3/2004 | Gonten | |
| 6,745,184 B1 | 6/2004 | Choi et al. | |
| 6,772,129 B2 | 8/2004 | Alvarez et al. | |
| 6,868,525 B1 * | 3/2005 | Szabo ........................... | 715/738 |
| 7,143,075 B1 * | 11/2006 | Chickering et al. ............ | 706/47 |
| 2002/0053078 A1 * | 5/2002 | Holtz et al. ..................... | 725/14 |
| 2002/0124182 A1 * | 9/2002 | Bacso et al. ................... | 713/200 |
| 2002/0174009 A1 * | 11/2002 | Myers et al. ................... | 705/14 |
| 2003/0014304 A1 | 1/2003 | Calvert et al. | |
| 2003/0065555 A1 | 4/2003 | von Gonten et al. | |
| 2003/0078832 A1 * | 4/2003 | Alvarez et al. ................. | 705/10 |
| 2003/0171990 A1 * | 9/2003 | Rao et al. ....................... | 705/14 |

(Continued)

FOREIGN PATENT DOCUMENTS

JP 2001/243287 9/2001

OTHER PUBLICATIONS

Fletcher, R., "Quadratic Program", Pratical Methods of Optimization, 1987, pp. 229-255, 2nd Edition, John Wiley & Sons, Inc., New York.

(Continued)

*Primary Examiner* — John Weiss
*Assistant Examiner* — Darnell Pouncil
(74) *Attorney, Agent, or Firm* — Brinks Hofer Gilson & Lione (57) ABSTRACT

A method attributes credit for conversions to a plurality of event types. A plurality of probabilities that a single impression of each of a plurality of respective event types causes a conversion by one of a plurality of users are defined. A processor is used to select values for the plurality of probabilities so as to minimize a total squared error based on differences between an observed outcome for each user and a respective expected outcome for each user calculated from the plurality of probabilities.

11 Claims, 8 Drawing Sheets

U.S. PATENT DOCUMENTS

2003/0187719 A1*  10/2003  Brocklebank ................... 705/10
2003/0195793 A1   10/2003  Jain et al.
2003/0220837 A1*  11/2003  Asayama ........................ 705/14
2004/0054572 A1*   3/2004  Oldale et al. .................... 705/10

OTHER PUBLICATIONS

Peck et al., "Multiple Linear Regression", Introduction to Linear Regression Analysis, 2001, pp. 66-122, 3rd Edition, John Wiley & Son, Inc., New York.

International Search Report for International Application No. PCT/US2004/020985 dated Jul. 19, 2005.

PCT International Preliminary Report on Patentability for International Application No. PCT/US2004/020985 dated Jan. 3, 2006.

Written Opinion of the International Searching Authority for International Application No. PCT/US2004/020985 dated Jul. 19, 2005.

* cited by examiner

METHODS TO ATTRIBUTE CONVERSIONS FOR ONLINE ADVERTISEMENT CAMPAIGNS

This application claims the benefit of U.S. Provisional Patent Application No. 60/483,800, filed Jun. 30, 2003.

FIELD OF THE INVENTION

The present invention relates to electronic advertising generally, and more specifically to methods and systems for evaluating the effectiveness of advertising lines and campaigns.

BACKGROUND

When advertisers run an online advertising (ad) campaign, it is very common for them to utilize multiple channels, such as banner ads, email ads, promotion ads, broadband ads (to be viewed by Media Player, for instance) or the like. Within each channel, they may try many different ways to reach prospective customers. Consider banner ads, for instance. Advertisers may run ads on different web pages, such as Yahoo Sports, Yahoo Finance, Yahoo News, or the like. They may also use search-word targeting (i.e., targeting users who are searching with certain keywords), or demographic targeting (i.e., targeting users with certain demographic criteria), behavioral targeting (i.e., targeting users who demonstrated certain interests previously), or other targeting methods. Furthermore, they may use different ad formats such as North Banners (N), Skyscrapers (SKY), Large Rectangles (LREC), Buttons, simple text links, etc. And, they may use multiple ad messages such as "10% off", "$5 off", or the like.

The following terminology is introduced:

Ad Line. An ad line is a component of an ad campaign that runs with a specific combination of web pages (or other channels), targeting constraints, ad format, and ad message. An ad campaign often consists of many ad lines that run simultaneously. For instance, an advertiser may have two ad lines running at the same time: (1) a "10% off" message on the SKY position of "Yahoo Finance," and (2) a "$5 off" message on the N position of "Yahoo News," targeting only female users. The term "ad line," as used herein, is not limited to communications that solicit the sale of goods or services, but more broadly cover a variety of campaigns that may seek to deliver goods, services or information of all kinds, regardless of whether any cost or fee is involved.

Ad Event, and Event Stream. There are two kinds of ad events: A view event is an ad impression being delivered to a user. (For this purpose, an impression rendered using audio is also referred to below as a view event). A click event is an ad being clicked on (or otherwise selected) by a user. A campaign typically consists of many different types of events, each type corresponding to an ad line. For instance, assume that a user was exposed to impressions from Line A 10 times and Line B 20 times, and clicked on one of the impressions from Line A. In this example, the user's event stream includes 10 V-A events (views from Line A), 20 V-B events (views from Line B), and 1 C-A event (click on Line A).

Conversion. A conversion is an action or response by the user that is viewed as an end goal of the advertiser. For instance, a conversion may be (a) a purchase, (b) opening a new account, (c) viewing a video clip, (d) a visit to an advertiser's page (such as the first application-form page), or the like.

After running an ad campaign for some time, advertisers often want to evaluate the performance of each line and find out which ads are more effective, so they can optimize the overall campaign performance. For instance, suppose Line A has delivered 1,000,000 ad impressions to a first group of users and generated 200 conversions, while Line B has also delivered 1,000,000 ad impressions to a second group of users (where there is no overlap between the first and second groups of users), but only generated 100 conversions. Line A is clearly more effective than Line B, and hence Line A should be used more in order to maximize the overall conversion rate.

In a typical case, however, an ad campaign may have multiple lines, and users may be exposed to a variety of combinations of two or more lines. In these circumstances, there is no simple solution for crediting one of the lines with the conversion.

A method and system to determine how many conversions an ad line has generated is desired.

SUMMARY

In some embodiments, a method is provided to attribute credit for conversions to a plurality of event types. A plurality of probabilities that a single impression of each of a plurality of respective event types causes a conversion by one of a plurality of users are defined. A processor is used to select values for the plurality of probabilities so as to minimize a total squared error based on differences between an observed outcome for each user and a respective expected outcome for each user calculated from the plurality of probabilities.

In some embodiments, a method is provided to attribute credit for conversions to a plurality of event types. A plurality of probabilities that a single impression of each of a plurality of respective event types causes a conversion by one of a plurality of users are defined, such that a conversion probability is based on an exponential function of the probabilities corresponding to each event type and a respective number of occurrences of each event type. A processor is programmed with a logit model to select values for the plurality of probabilities.

In some embodiments, a method of attributing credit for conversions to a plurality of event types is provided. A first plurality of probabilities that a single impression of each of a plurality of respective event types causes a conversion by one of a first subset of a plurality of users is defined. Each of the first subset of users is exposed to only one type of event. A second plurality of probabilities that a single impression of each of the plurality of respective event types causes a conversion by one of a second subset of the plurality users is defined. Each of the second subset of users is exposed to at least two types of events. The second plurality of probabilities reflect synergy between at least two of the event types. Impressions having the event types delivered to the plurality of users, and conversions by the plurality of users are tracked. A programmed processor calculates values for the first and the second plurality of probabilities based on the tracked impressions and conversions.

In some other embodiments, a method of attributing credit for conversions to a plurality of event types comprises the steps of: (a) estimating a set of values for a probability that a single impression of each of a plurality of event types causes a conversion by a given one of a plurality of users; (b) apportioning event credit for each respective event type to each respective user based on a fraction of the total events for that user corresponding to each event type and the estimated value corresponding to that event type; and (c) normalizing the apportioned event credits to form a revised set of values. At least one of the steps of estimating, apportioning or normalizing is performed by a processor.

DETAILED DESCRIPTION

U.S. Provisional Patent Application No. 60/483,800, filed Jun. 30, 2003, is incorporated by reference herein in its entirety.

1. Attribution

A method and system are described to determine how many conversions an ad line has generated. Two issues are involved:

1. Event Tracking. Each user's event stream (or the event streams of a sample set of users sufficient to represent the population of users to whom the campaign is delivered) are tracked, and a determination is made whether each user has converted. In preferred embodiments, the online publisher collects the following information for every user during the course of a multiple-line ad campaign for a product:
 a. types of event rendered for that user;
 b. number of occurrences of each type of event;
 c. date of each occurrence;
 d. outcome (conversion—yes or no);
 e. date of conversion (if applicable).

2. Conversion Attribution. If a user is exposed to more than one ad line in a campaign, and a conversion occurs, a determination is made as to what drove the conversion. More specifically, a determination is made as to how much each ad event (in the converter's event stream) has contributed to this conversion. A fair amount of credit (in proportion to its contribution) should be assigned to each event. For instance, click events are typically more effective than view events, and thus should get more credit.

The exemplary embodiments include methods and systems for addressing the second problem, focusing on conversion attribution. An embodiment based on a simplified model is presented first to describe the relationship between ad events and conversions. The simplified model is based on several simplifications of the real-world problem. Alternative embodiments employing refinements to the model are then presented in order to handle several real-world issues, including Hidden Events, Ad Saturation, Memory Degradation, and Navigational Usage.

2. Additive Impression Model or AIM

The Additive Impression Model (or AIM) models a user's conversion probability as a linear function of his/her ad events:

$$\text{Conversion probability} = \Sigma(Pe*Ie) \text{ for all events } e \quad (1)$$

where Ie is the number of occurrences of event e, and
 Pe is a non-negative constant (yet to be determined). Pe essentially represents the effectiveness of an event in driving conversions. Some ad events (such as Large Rectangle ads) may be more effective than the others (such as small Button ads). Hence, different events will have different values of Pe.

Assumptions

In some embodiments, the simplified Additive Impression Model makes the following assumptions:

1. Linearity: The conversion probability increases linearly as the number of ad events increases.

2. Additive effects: Different types of events drive conversions independently and hence their effects are additive.

3. Complete information: The event tracking system captures all the events that can drive conversion.

4. Perfect memory: Once people see ads, they don't forget them. Consequentially, the timing of events is not a factor of conversion. For instance, an event that took place 7 days ago is just as effective in driving conversion as an event that took place 1 hour ago.

Some of these assumptions are relaxed in additional embodiments discussed further below. The next few sections describe methods to compute the constants Pe in Equation (1).

The Attribution Problem

The attribution problem can be stated as follows:

Input data: the event streams of users who have been exposed to the ad campaign. Each event stream includes two parts:

Iu,e: Number of occurrences of event e pertaining to user u, and

Ou: conversion outcome (either 0 or 1) indicating whether user u has converted.

Output data: Pe in Equation (1).

Note: Regarding input data, there are typically far more non-converters than converters. When it is computationally prohibitive to collect the event streams of all non-converters, sampling can be used. Note also the assumption that: $Pe \geq 0$. That is, the model assumes that increasing the number of impressions never reduces the likelihood of a conversion.

The Square-Error Minimization Method

In this method, Pe is found by selecting the value of Pe that minimizes the following error function:

$$\Sigma_u(Ou - \Sigma_e Pe*Iu,e)^2 \text{ for all events } e, \text{ for all users } u \quad (2)$$

This is an ordinary Least Square Error problem, and can be solved by multi-variable linear regression analysis (as described in D. C. Montgomery, E. A. Peck, and G. G. Vining [2001], "Introduction To Linear Regression Analysis", $3^{rd}$ Edition, John Wiley & Sons, Inc. New York, which is incorporated by reference herein.)

Many software packages (for example, SAS) are available to perform linear regression analysis. A problem with the linear regression approach is that, it may yield a negative Pe for some events, meaning that exposure to certain events will reduce the likelihood of conversion or cause people not to convert.

A simple fix is to use exp(P'e) to replace Pe in Equation (2), to ensure a non-negative Pe. Then, Pe is simply calculated as $P'e^2$. However, with this replacement, the mathematical problem is not linear any more and is harder to solve. Another optimization method is Quadratic Programming (R. Fletcher [1987], "Practical Methods of Optimization", 2nd Edition, John Wiley & Sons, Inc., New York, which is incorporated by reference herein.) Techniques exist to find the optimal solution for a Quadratic Program, with variables subject to linear bounds, in particular such as Pe>=0.

Figure 1:
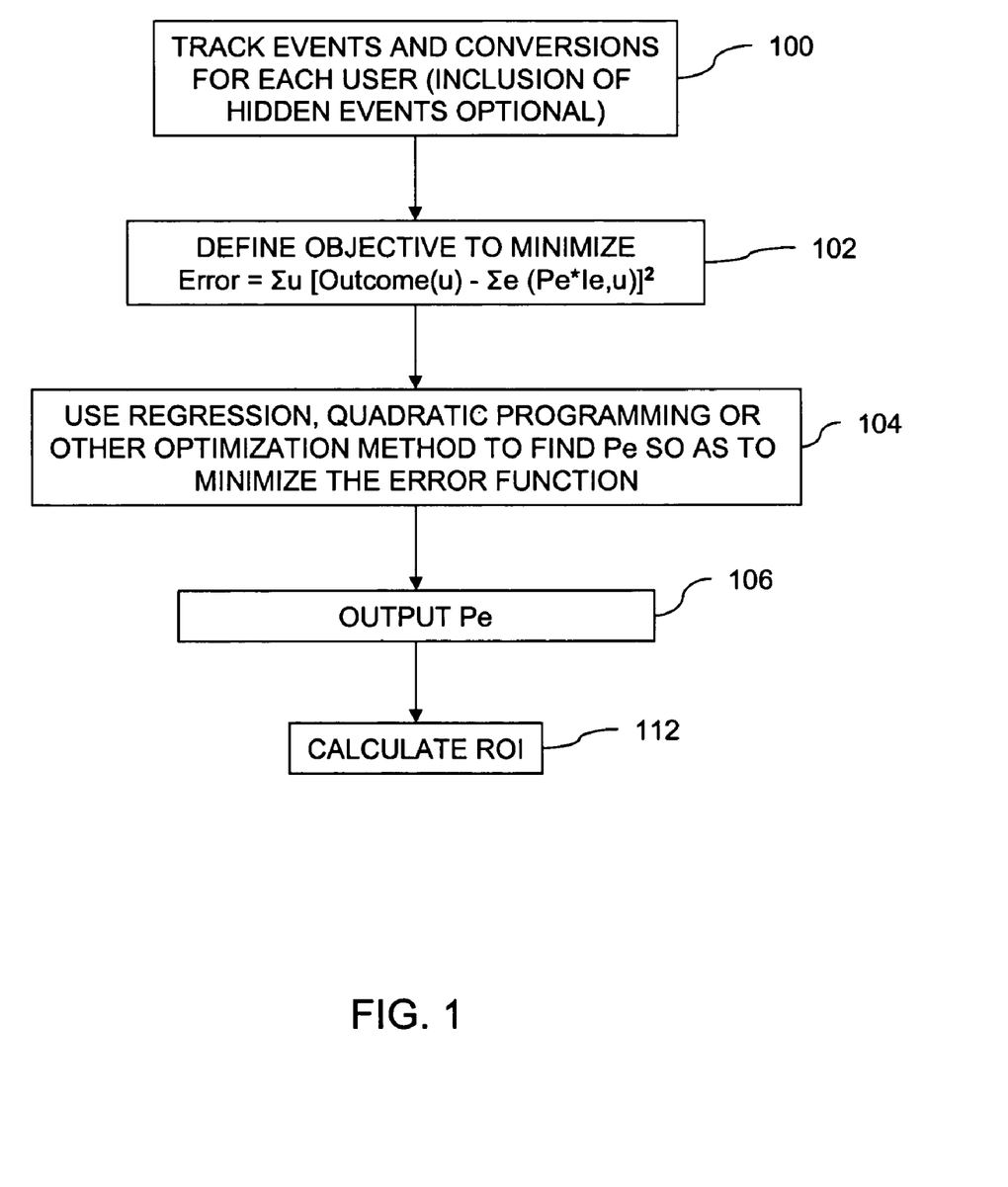
FIG. 1 is a flow chart diagram of a first exemplary method for calculating a probability that each of a plurality of events will cause a conversion.

FIG. 1 is a flow chart showing the least squares method.

At step 100, the events and conversions are tracked for each user. It is optional to identify hidden events, but by definition, individual impressions of the hidden events are not tracked.

Step 102 provides a means for calculating a respective sum of the squared errors (SSE). At step 102, a sum is calculated for each user, by summing the products of the number of each event for that user multiplied by the probability that each event leads to a conversion. Then an error is determined by the difference between the sum and the observed outcome.

At step 104, regression, quadratic programming, or other optimization method is used to find Pe, so as to minimize the error function.

At step 106, the value of Pe is output for use in the attribution model.

At step 108, the return on investment for each ad line can be determined by allocating the revenue stream for the goods or services being sold to the various ad lines that are determined to have contributed to the conversions, in accordance with the various event credits.

The Iterative Method

In this method, Pe is obtained by iteratively finding more and more accurate answers. The iterative algorithm is based on two propositions:

Proposition 1. Suppose Pe is already known (or an estimate of Pe is available). Given any converter u, each event's contribution (to the conversion) is simply determined by the following proportions: the contribution of each event e is proportional to (Iu,e*Pe), according to Equation (1).

Proposition 2. Suppose the contribution of each event is already known. Pe is simply calculated as (C divided by I), where C is the total number of contributions made by event e in the whole ad campaign, and I is the total number of occurrences of event e in the whole campaign.

The algorithm is illustrated by the following example. Table 1 shows two converters (users A and B) and 2 non-converters (users C and D) as shown by the value in the 'outcome' column. In this example, there are 3 different event types involved: e1, e2, and e3, but the method may be used for campaigns involving any number of events. Columns 2-4 of Table 1 show the number of occurrences (impressions rendered) for each event, for each user. For instance, Converter A had three impressions of e1, one impression of e2, and none of e3.

Initially it is assumed that $$Pe1 = Pe2 = Pe3. \quad (3)$$

By Proposition 1, 3/4 of user A's conversion should be credited to e1, and 1/4 to e2, and 0/4 to e3. Similarly, 3/5 of user B's conversion should be credited to e2, and 2/5 to e3. Since user C and user D do not have conversions, all events receive no credit for those users. Columns 6-8 shows the contribution of each event for each user.

TABLE 1

Illustration of Proposition 1. Initially, we assume that Pe1 = Pe2 = Pe3.

| user | Ie1 | Ie2 | Ie3 | Outcome | e1's credit | e2's credit | e3's credit |
|---|---|---|---|---|---|---|---|
| A | 3 | 1 | 0 | 1 | 0.75 | 0.25 | 0 |
| B | 0 | 3 | 2 | 1 | 0 | 0.60 | 0.4 |
| C | 8 | 0 | 5 | 0 | 0 | 0 | 0 |
| D | 1 | 1 | 1 | 0 | 0 | 0 | 0 |
| Total | 12 | 5 | 8 | | 0.75 | 0.85 | 0.4 |

The last row of Table 1 shows the total count of each event (Columns 2-4) and the total contribution of each event (Columns 6-8). For instance, e1 took place 12 times in total and claimed a credit of 0.75 conversion. By Proposition 2, to normalize the results for determining the effect of a single impression, the total credit values in columns 6-8 are divided by the total impressions values in columns 2-4, respectively to obtain Pe for events 1-3 respectively. Pe1=0.75/12=0.0625. Similarly, Pe2=0.85/5=0.17, and Pe3=0.4/8=0.05. Or, roughly $$Pe1:Pe2:Pe3=1:2.72:0.8. \quad (4)$$

Repeating the above process using equation (4) instead of equation (3), the values of Pe can be refined as shown in Table 2. For example, the credit attributed to event e1 for user A is now calculated as [3*1/(3*1+1*2.72)]=0.52. The credit attributed to event e2 for user B is now calculated as [1*2.72/(3*1+1*2.72)]=0.48.

TABLE 2

Second Iteration, with Pe1:Pe2:Pe3 = 1:2.72:0.8.

| user | Ie1 | Ie2 | Ie3 | Outcome | e1's credit | e2's credit | e3's credit |
|---|---|---|---|---|---|---|---|
| A | 3 | 1 | 0 | 1 | 0.52 | 0.48 | 0 |
| B | 0 | 3 | 2 | 1 | 0 | 0.84 | 0.16 |
| C | 8 | 0 | 5 | 0 | 0 | 0 | 0 |
| D | 1 | 1 | 1 | 0 | 0 | 0 | 0 |
| Total | 12 | 5 | 8 | | 0.52 | 1.32 | 0.16 |

After the second iteration, we now obtain Pe1=0.52/12=0.043; Pe2=0.264; and Pe3=0.16/8=0.02. Then the normalized ratio of Pe1:Pe2:Pe3=0.52/12:1.32/5:0.16/8=1:6.09:0.46. In this fashion, Pe is iteratively refined until Pe converges.

The iterative attribution algorithm is summarized as follows:

Step 1: set Pe to 1 (or any other positive number) for all events e.

Step 2: attribute credit to each event according to Proposition 1.

Step 3: compute new Pe for each event according to Proposition 2.

Step 4: compute the Euclidean distance E between old Pe and new Pe.

Step 5: if E is greater than a certain threshold, go to step 2, or else exit.

The algorithm can be run on a continuous basis. Thus, for example, in a two week campaign, all the data collected during the two weeks may be used to model the conversion process and to decide how to allocate the conversions. For a long campaign, one may use data collected in a two-week window (for example) to model the conversion process, and one may slide the two-week window as the campaign runs.

Figure 2:
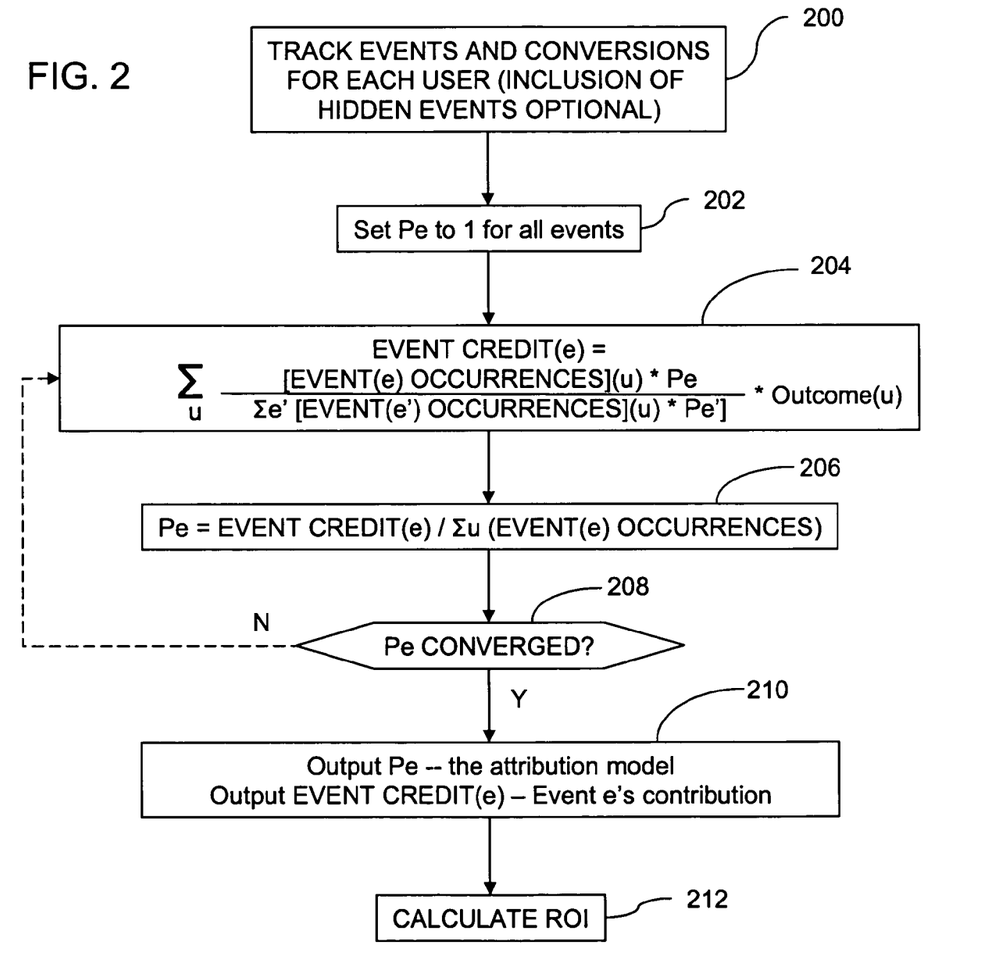
FIG. 2 is a flow chart diagram of a second exemplary method for calculating a probability that each of a plurality of events will cause a conversion.

FIG. 2 is a flow chart diagram of the iterative method.

At step 200, the events and conversions are tracked. This may optionally include making allowances for hidden events, saturation, and passage of time (explained further below).

At step 202, an initial set of values for Pe is assumed. For example, the means for estimating a set of values for Pe may initially assume that Pe is 1 for all event types. Alternatively, the estimating means can use an SSE minimization technique, such as that described above with reference to FIG. 1.

At step 204, event credit is apportioned based on the occurrences of each event per user and the outcome.

At step 204, event credit is apportioned. For example, the means for apportioning event credit may use the equation:

$$EventCredit(e) = \sum_u \frac{[Event(e)occurences(u)] * Pe}{[Event(e')occurences(u)] * Pe'} * Outcome(u)$$

At step 206, an updated value of Pe can be calculated using, for example, the following equation:

$$Pe = Event\ Credit(e) / \sum_u (Event(e)Occurrences)$$

At step 208, each time a refined set of Pe values is calculated, the new set and previous set are compared until a convergence criterion is satisfied (e.g., percentage change between iterations becomes sufficiently small).

At step 210, when a set of value for Pe is determined, the values of Pe and Event Credit(e) are output for use in the attribution model. The system can be used to predict the probability that any given event stream will cause a given user to convert.

At step 212, the return on investment for each ad line can be determined by allocating the revenue stream for the goods or services being sold to the various ad lines that are determined to have contributed to the conversions, in accordance with the various event credits.

Logit Transformation

There is a mathematical problem with Equation (1), which is repeated below for convenience.

Conversion probability=$\Sigma(Pe*Ie)$ for all events $e$

Since Equation (1) is a linear function and does not have an upper bound, it is quite possible to obtain "probability>1", which does not make sense. A solution to the problem is to use:

log($P/(1-P)$)=$\Sigma(Pe*Ie)$ for all events $e$     (1')

or $P=1/(1+\exp(-(\Sigma(Pe*Ie))))$ where P is the conversion probability. When there is no constraint on Pe, this is known as the logit model and can be solved by logistic regression (reference book: "Introduction To Linear Regression Analysis", mentioned above). With constraints Pe$\geq$0, this becomes a non-linear optimization problem and the global optimal solution may not be easily found. A gradient descent method can be used to find a local optimal solution.

To address the "probability>1" problem with the iterative method (described above), the iterative method can be applied as described above, and for each user, the following calculation is performed:

$L=\Sigma(Pe*Ie)$ for all events $e$     (1'')

Then, the conversion probability is computed as probability=$1/(1+\exp(-(a+b*L)))$ where 'a' and 'b' are constants to be determined. Constants 'a' and 'b' can be determined by applying logistic regression to the following modeling problem:
input variable: L for each user as determined by (1'')
output variable: conversion outcome (0 or 1) for each user.

Figure 8:
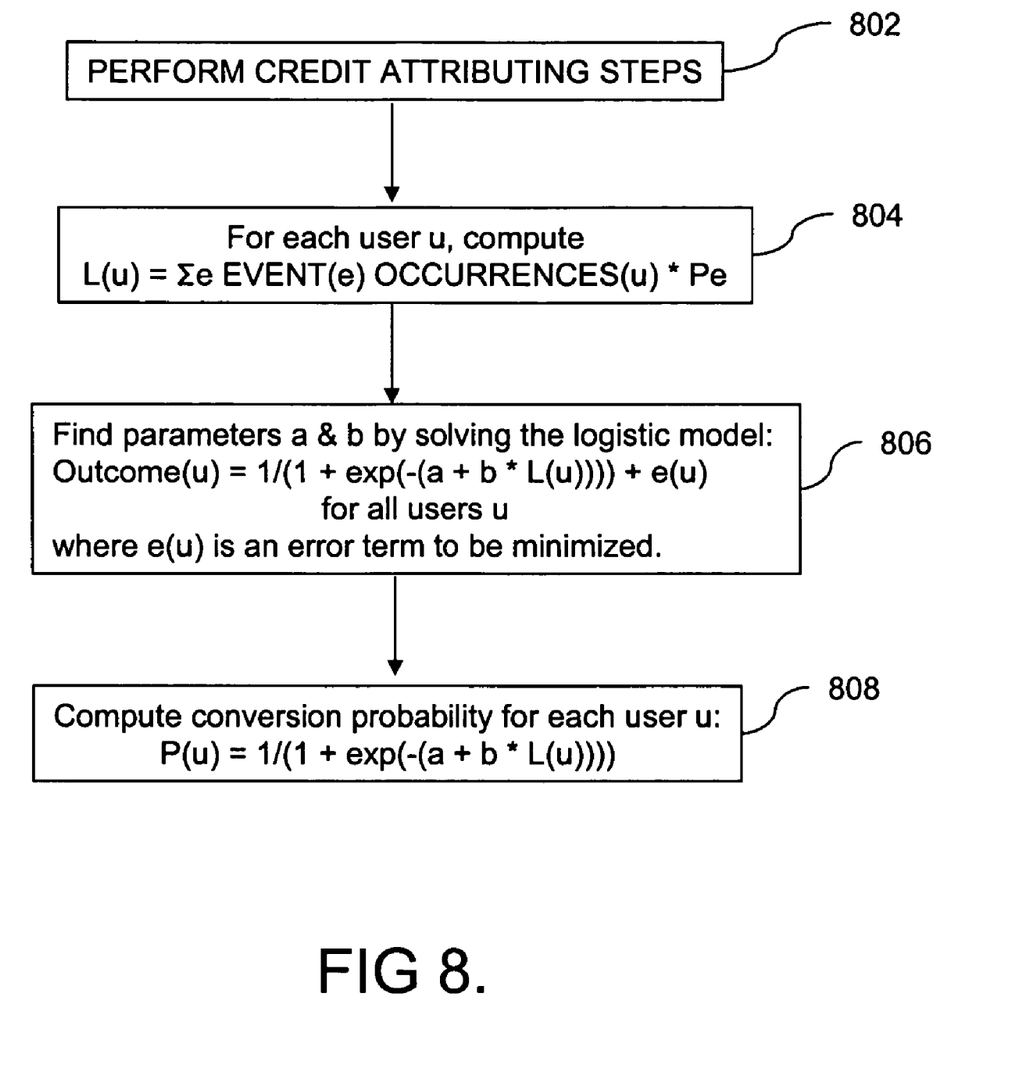
FIG. 8 is a flow chart diagram for a variation including a logit transformation.

FIG. 8 is a flow chart diagram showing the application of the logit transform to the attribution problem.

At step 802, the credit attribution steps described above with reference to FIG. 1 or FIG. 2 (or a variant of either embodiment) is performed.

At step 804, for each user u, the function L(u) is computed, according to:

$L(u)=\Sigma eEVENT(e)OCCURRENCES(u)*Pe$

At step 806, the parameters a and b are found by solving the logistic model:

Outcome($u$)=$1/(1+\exp(-(a+b*L(u))))+e(u)$ for all users u, where e(u) is an error term to be minimized.

At step 808, the conversion probability for each user u is calculated by the equation:

$P(u)=1/(1+\exp(-(a+b*L(u))))$

3. Hidden Events

One of the AIM assumptions is that complete information is available to correctly estimate Pe. In reality, the online event tracking system may not get the complete picture of a user's ad exposure. For instance, an Internet publisher may be capable of tracking ad events that are delivered on its own websites, but not be able to determine whether a user has been exposed to similar ads on TV or newspaper or other media. Even tracking of online events cannot be perfect. A user can assume multiple online IDs. Instead of one event stream for each unique user, the Internet publisher may have collected two event streams for the same user (without knowing they belong to the same user), such as one for the person's event stream at work and the other at home.

Essentially every user may have certain ad events that cannot be completely tracked. These unknown events (e.g., seeing ads on TV, or on a billboard) may have contributed to conversions, and they should be credited accordingly (so as to allow a more realistic assessment of the effectiveness of the online ad lines).

To deal with incomplete information, the notion of Hidden Events is introduced. A hidden event is an "artificial" event added to each user's event stream, and the hidden event represents all unknown ad events that could have reached the user. Multiple users may share a hidden event. For instance, in some embodiments, users who are exposed to event A and nothing else may be considered to share the same hidden event HA. Similarly, users who are exposed to only event B and C may be considered to have the same hidden event HBC.

Once hidden events are added to users' event streams, they are treated like normal events, and may receive credits from the attribution methods as described above. In the inventors' experiences, many users convert in spite of little or no online ad exposure as suggested by the event tracking system. Most likely, those converters have certain ad events that were not tracked. The use of hidden events can at least partially address such issues.

Figure 3:
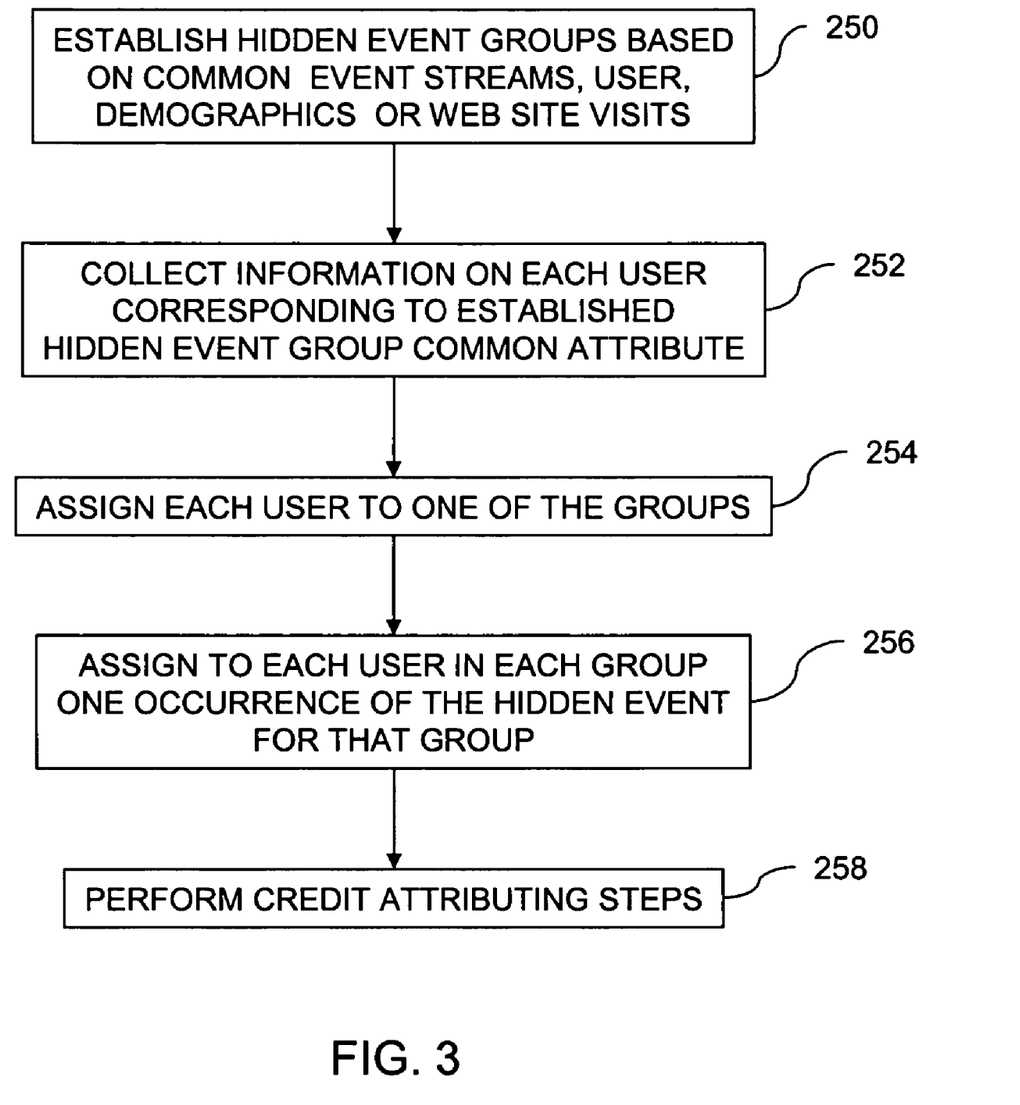
FIG. 3 is a flow chart diagram showing the incorporation of hidden events into the conversion probability analysis.

FIG. 3 is a flow chart diagram showing a technique for introducing hidden events.

At step 250, a plurality of hidden event groups are established, based on one or more attributes or metrics, such as common event streams, common user demographics, common geographic locations, or common web site visits.

At step 252, the system collects information on each user, corresponding to the hidden event common attribute on which the established groups are based. For example, the information collected may include volume of impressions rendered for this user, web site usage, or whether the user makes a conversion.

At step 254, the users (both converters and non-converters) are assigned to the groups according to the attribute(s) or metric(s); and users in the same group share the same hidden event.

At step 256, a unique hidden event is introduced to each group.

At step 258, the credit attribution described above with reference to FIG. 1 or 2 is performed, treating the hidden event like another event to which the user is exposed.

For the purpose of steps 250-254, one can group users based on certain user attributes, including event streams (e.g., heavy versus light users)
demographics (e.g., college students versus non-students)
geographic locations (e.g., New York DMA versus Los Angeles DMA)
visits to websites In step 256, every user in any given group is assumed to have exactly one hidden event—the single hidden event is supposed to represent all the things to which that given group is exposed that are hidden.

It is preferable not to assign different numbers of occurrences of the hidden event to different users, because by assigning different numbers to different users for the same hidden event, an artificial bias is introduced into the data. Every user in the same group should have the same number of occurrences of the hidden event, which can be "1."

In some exemplary embodiments, only event streams are used for grouping. There are many ways to group users based on only event streams.

In some embodiments, users are grouped into heavy web site users and light web site users. Light users have not been exposed to very many online events, so the hidden event to which they are exposed is considered to have a high influence in causing a conversion. Heavy users are exposed to many more online events, so the hidden event to which they are exposed is considered to have a lesser influence in causing a conversion.

For example, in some embodiments, the hidden event is assumed to have the same absolute number (1 impression) for all users; this would constitute a relatively higher percentage of all impressions for a light user, but a relatively lower percentage of impressions for a relatively heavy user.

In other embodiments, users are grouped by multiple dimensions. For example, two dimensions may include event streams and number of impressions. If there are three types of event streams and the number of impressions is divided into heavy and light, then there would be (3×2=) six groups As another example, two dimensions may include event streams and demographics.

4. AIM with Saturation or AIMS

AIM is a linear model. It assumes that the conversion probability increases linearly with the event counts. However, in reality, the conversion probability does not increase linearly; it typically increases faster for the first several ad impressions and more slowly afterwards. Additional impressions have diminishing marginal returns. After hundreds of impressions have been delivered to a user, his/her conversion probability reaches a plateau (or approaches an asymptote), as more impressions will not increase the probability by much. This effect is referred to herein as "Ad Saturation". See FIG. 5 for illustration.

Figure 5:
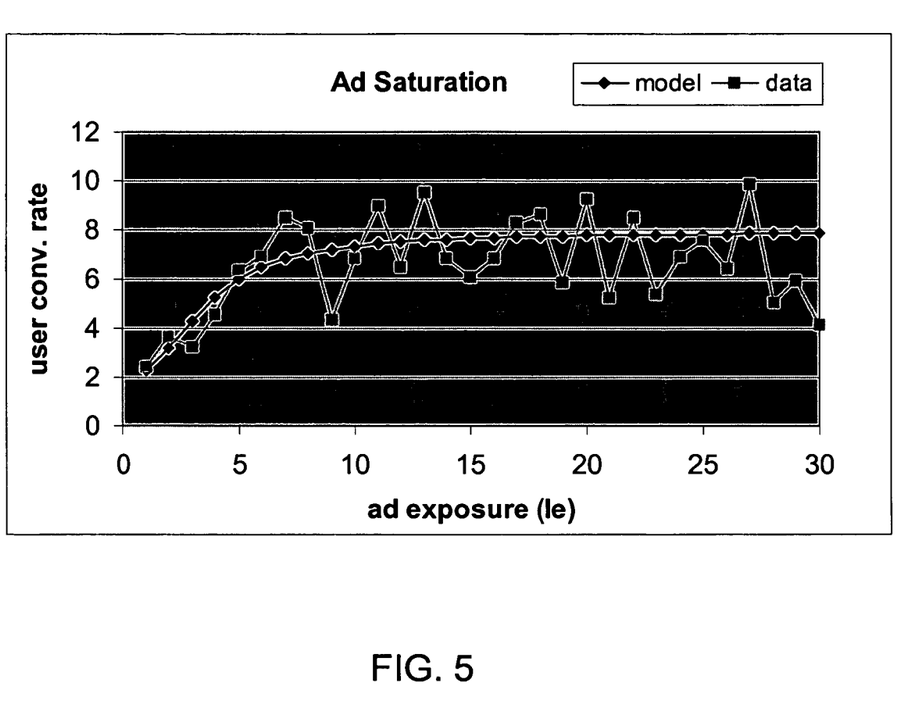
FIG. 5 is a diagram showing saturation.

To take into account ad saturation, an Additive Impression Model with Saturation (AIMS) may be used. A user's conversion probability P is now modeled by:

$$P = \Sigma [Pe * \text{saturation}(Ie)] \text{ for all events } e \quad (5)$$

where
Pe is a non-negative constant,
Ie is the number of occurrences/impressions of event e,
saturation (Ie) is a function that approximates the saturation curve shown in FIG. 5.

Due to ad saturation, 10 ad impressions (for example) are not 10 times as effective as one ad impression. It is possible that the 10 impressions are as effective as five impressions in a campaign without ad saturation. The function saturation(Ie) serves as a function that "squashes" actual ad impressions into "effective impressions". There are many possible forms of the squashing function. In some embodiments, the following squashing function may be used:

$$\text{saturation}(Ie) = \text{atan}(Oe + Se * Ie) / \text{atan}(Oe + Se) \quad (6)$$

where
Oe is an offset constant for event e,
Se is a scaling constant for event e,
atan(.) is the arctangent function, and
atan(Oe+Se) serves as a normalization factor to ensure that saturation (1)=1.

With AIM, only Pe is unknown. With AIMS, two more values are to be determined: Oe and Se. As in the case of AIM, one may try to solve this problem as a square-error minimization problem. This method, however, may not work well, because the minimization problem here is highly nonlinear and it is easy to get stuck in a poor local minimum.

In some embodiments, the following algorithm is used for AIMS:

1. First determine Pe using AIM (with either the error minimization method or the iterative method), assuming there is no ad saturation. Part of the results from this step is a set of saturation curves; that is, the conversion probability of users who were exposed to event E exactly N times, for all possible E and N—see the curve with square-mark data points in FIG. 5 for an example of a saturation curve of an event.

2. Then use the saturation curves from Step 1 to build a saturation model for each event. In other words, for each event e, find the parameters Oe and Se so that the function (6) fits the saturation curve best. See the smooth curve with diamond data points in FIG. 5 for an example of a fitted saturation model for an event.

3. Then use the saturation models (obtained in Step 2) to transform the actual event count into the "effective impressions" for every user and every event. This transformation effectively turns the problem into a linear one, and AIM can be applied to re-compute Pe. Once again, part of the results from this step is a new set of saturation curves, which can be used to refine Oe and Se (Step 2).

4. Repeat Step 2 and 3 until there is little change in the saturation models between iterations.

Figure 4:
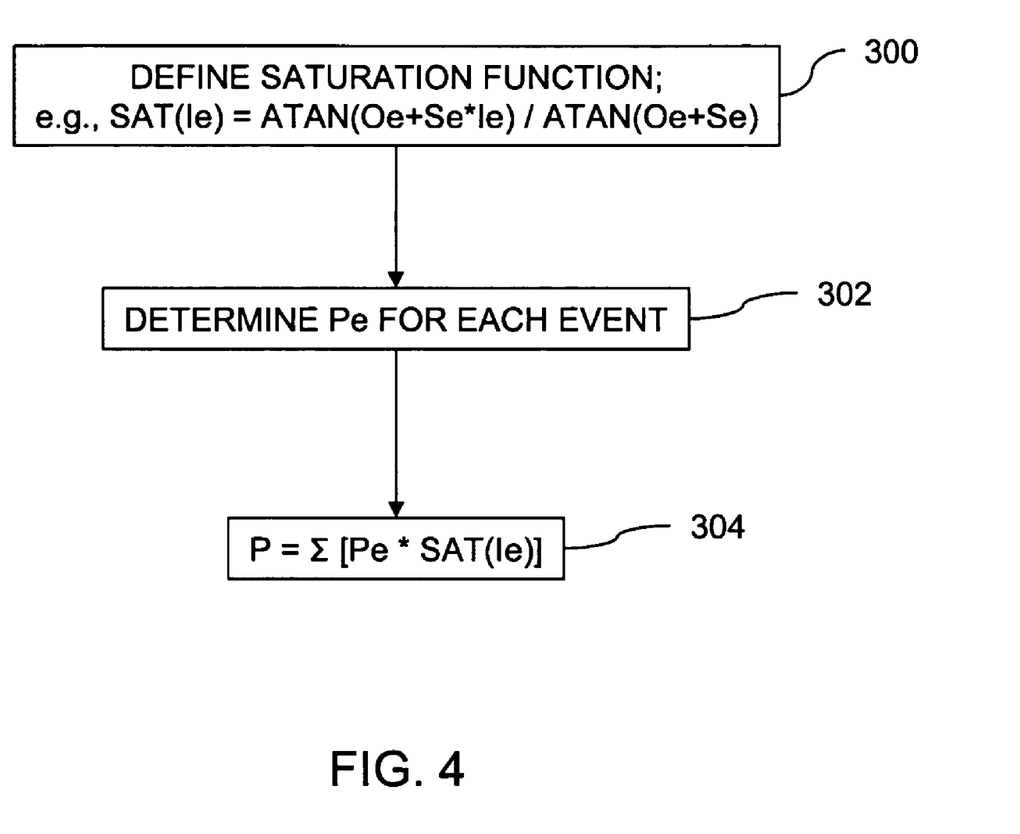
FIG. 4 is a flow chart diagram of a saturation model.

FIG. 4 is a flow chart diagram showing how the model accounts for saturation.

At step 300, a saturation function is defined. For example, the saturation function saturation $(Ie) = \text{atan}(Oe + Se * Ie) / \text{atan}(Oe + Se)$ may be used, or another saturation function may be used.

At step 302, Pe is determined for each event, using one of the methods described above with reference to FIG. 1 or 2.

At step 304, a given user's probability of conversion can be estimated by summing the probability of conversion for each event, multiplied by the appropriate saturation factor for the given number of impressions of each event for that user.

Synergy of Different Ad Events

AIMS assumes that different types of events drive conversions independently and hence their effects are additive. However, it is believed that two (or more) different ad events can sometimes create synergy effects when shown together or close in time. For instance, an ad campaign may show users a branding ad to first to get their attention, and later show a promotion ad to get their conversions. Showing a branding ad followed by a promotion ad may work more effectively than just showing a branding ad or a promotion ad alone.

If such synergy effects indeed exist, the simple additive models may not be accurate enough. A technique is described below, with which AIMS can be used to model the synergy effect as well. The technique can be illustrated by an example:

Suppose E1 and E2 are the only events involved in a campaign and it is believed there is a synergy between them. Without synergy, the model described above is (ignoring saturation):

Conversion probability=$Pe1*Ie1+Pe2*Ie2$.

To model the synergy, one can use:

Conversion probability=$P'e1*I'e1+P'e2*I+e2+P''e1*I''e1+P''e2*I''e2$, where I'e1, I''e1, I'e2, and I''e2 are determined by Ie1 and Ie2 as shown in the following table:

TABLE 3

| Ie1 | Ie2 | I'e1 | I'e2 | I''e1 | I''e2 |
|-----|-----|------|------|-------|-------|
| 0   | 0   | 0    | 0    | 0     | 0     |
| X   | 0   | X    | 0    | 0     | 0     |
| 0   | Y   | 0    | Y    | 0     | 0     |
| X   | Y   | 0    | 0    | X     | Y     |

Basically the single-event users are modeled with parameters P'e1 and P'e2, and the couple-event users are modeled with parameters P''e1 and P''e2.

When there are N event types, there are $N*(N-1)/2$ different pairs of events with possible synergy between them. When N becomes large, it may be intractable to model all possible pairs. In practice, it is acceptable to only model synergy effects for events that have high correlation between them.

Essentially, events e1 and e2 can be replaced by four new events, e1', e2', e1'', and e2'' (that is, e1 and e2 are dropped, and the four new ones are added). The replacement is performed for all users. Credit attribution is performed, and as a result, credit(e1'), credit(e2'), credit(e1'') and credit(e2'') are determined. Finally, credit(e1) is set equal to credit(e1')+credit(e1''), and credit(e2) is set equal to credit(e2')+credit(e2'').

Figure 7:
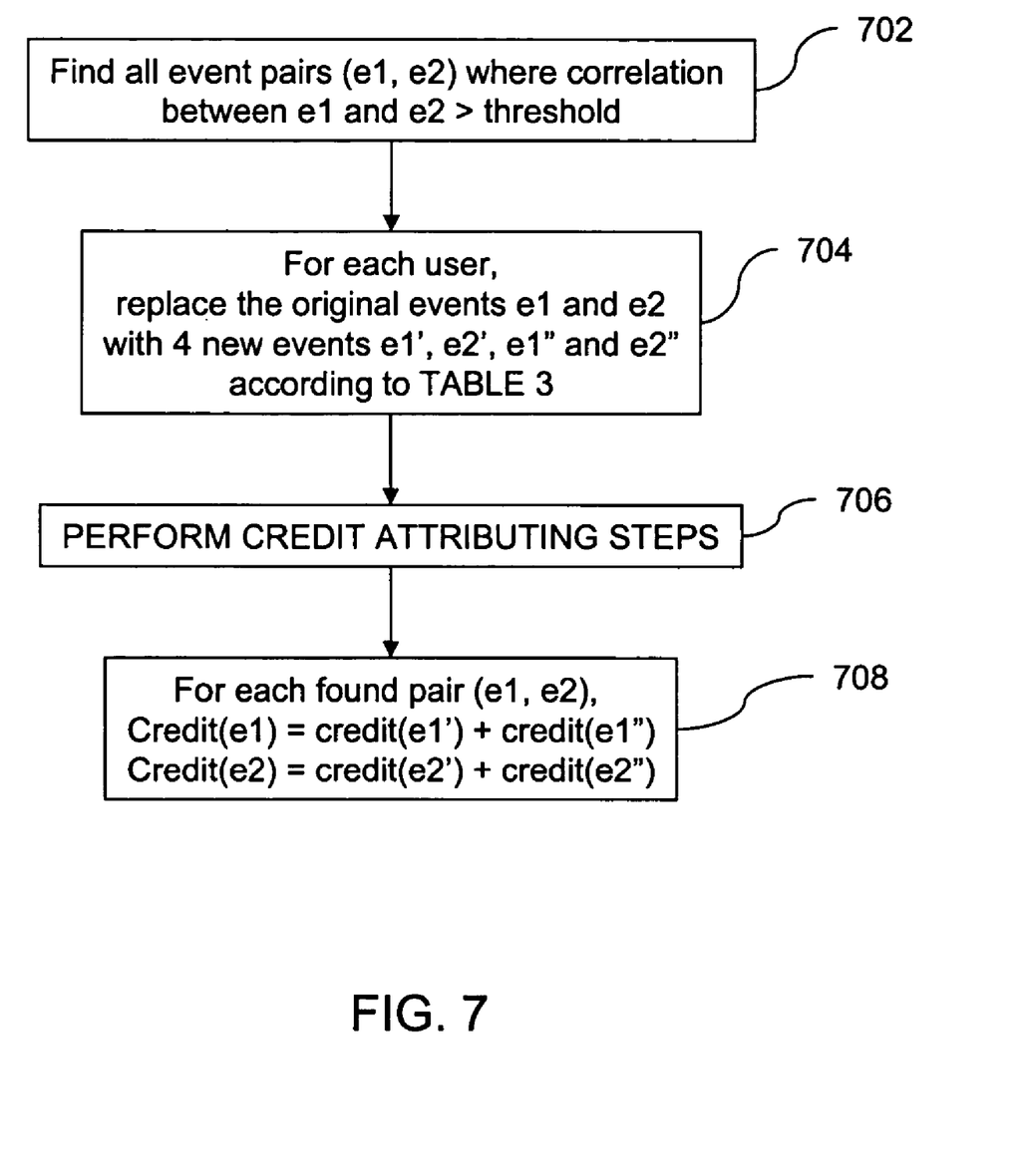
FIG. 7 is a flow chart diagram of a method of modeling synergy effects.

FIG. 7 is a flow chart diagram showing the application of the above model to the problem of attribution where synergy is present.

At step 702, this step finds all event pairs (e1, e2) where correlation between e1 and e2 is greater than a predetermined threshold.

At step 704, for each user, the original events e1 and e2 are replaced with four new events e1', e2', e1'' and e2'' according to Table 3.

At step 706, the attribution steps described above are performed.

At step 708, For each found pair (e1, e2), Credit(e1)=credit (e1')+credit(e1'') Credit(e2)=credit(e2')+credit(e2'').

5. Memory Degradation

People don't have perfect memory of the ads that they saw previously. People may remember ads that they saw a few days ago, but may have difficulty remembering ads that they saw a month ago, unless the ads happened to interest them at that moment. Indeed, analyses of some online ad campaigns showed that the majority of online conversions take place within the next few days after people saw the ads.

Very often a converter was exposed to many ad impressions before conversion:

a) some impression might be from the previous few days,
b) some from a month ago, and
c) some from a few months ago.

The task is to determine which of those impressions ((a) or b) or c)) is most likely to be the main driving factor for this conversion, or to determine an effective number of current impressions corresponding to the older impressions of types (b) and (c). The answer depends on the nature of the advertised products or services. Once interested, people may not take much time deciding to sign up for free services or to purchase some inexpensive products (such as a CD or a book). In such cases, it is believed that a conversion is likely to be due to ads shown recently (a) rather than those shown a long time ago (b & c). On the other hand, people often take a long time to consider buying big-ticket items such as cars or High-Definition TV's. In such cases, it is believed that a purchase decision could be influenced by ads shown within the long decision-window.

To deal with these issues, one (or a combination of both) of the following two approaches may be used, for example:

1. Fixed Conversion Window. Depending on the nature of the advertised products or services, define a fixed conversion window, within which events are considered to be able to drive conversions. For instance, for book-store ads, the attribution algorithms only consider those events within 14 days (for instance) prior to conversion. For HDTV-store ads, a longer window (e.g., 42 days) might be used.

2. Memory Decay Model. Instead of assuming perfect memory within a conversion window and total memory loss beyond that window, one can use a memory decay model. (A possible decay function is 1/atan(time)). For instance, ten one-month-old impressions might be as effective as one of yesterday's impressions, while three one-week-old impressions might be as effective as one of yesterday's impressions. To use this model, take each user's event stream (with timestamps), compute the "effective count" of each event, and then apply AIM (or AIMS) as described above. Another possible decay function is 1/exp(time), where exp is the exponential function. Any other reasonable memory decay model may be used, so long as the results are consistent with observations.

6. Navigational Usage

Ads sometimes are used as a navigation vehicle to get to an online destination. For instance, a discount brokerage firm may advertise on Yahoo Finance. As a frequent visitor to Yahoo Finance, a user might have seen the ads many times and learned quite a lot about the brokerage firm. Someday, the user decides to open an account. So he/she visits Yahoo Finance, sees the same ad that he/she has seen many times before, clicks on the ad to land on the brokerage firm's website, and then fills out and submits an application form. In this example, the last ad event prior to the conversion did not influence the user's purchase intent. Instead, that ad was merely used as a navigation vehicle for the user to find the brokerage firm's website.

If an ad is often used as a navigation vehicle, the attribution algorithms described above will attribute large credit to such ad events, because these ad events participated in many conversions and appeared to correlate well with conversions, even though they did not increase purchase intent. In other words, an ad event frequently used for navigation purposes can be assigned more credits than it actually deserves.

Heuristics may be used to detect whether an ad event has been used as a navigation vehicle prior to conversion. One such heuristic is a Discard Window, a minimal time that is required to research a product and make a conversion. For big-ticket item purchases, people typically do not make a purchase without researching the advertised products (and possibly similar products from other merchants). In such cases, any ad events X minutes or less prior to conversion are mostly likely to be used as a navigation vehicle, where X can be different for different advertised products or services. In exemplary embodiments, the discard window is provided by humans, based on empirical data.

The navigational usage concept can complement the memory decay model. The memory decay model indicates that view events rendered a long time ago should not be given the same credit for a conversion as a relatively recent view event. The navigational usage concept, on the other hand, indicates that for high-cost goods or services, click events immediately preceding a conversion should not be given the same credit for the conversion as a relatively recent event preceding the click event.

Figure 6:
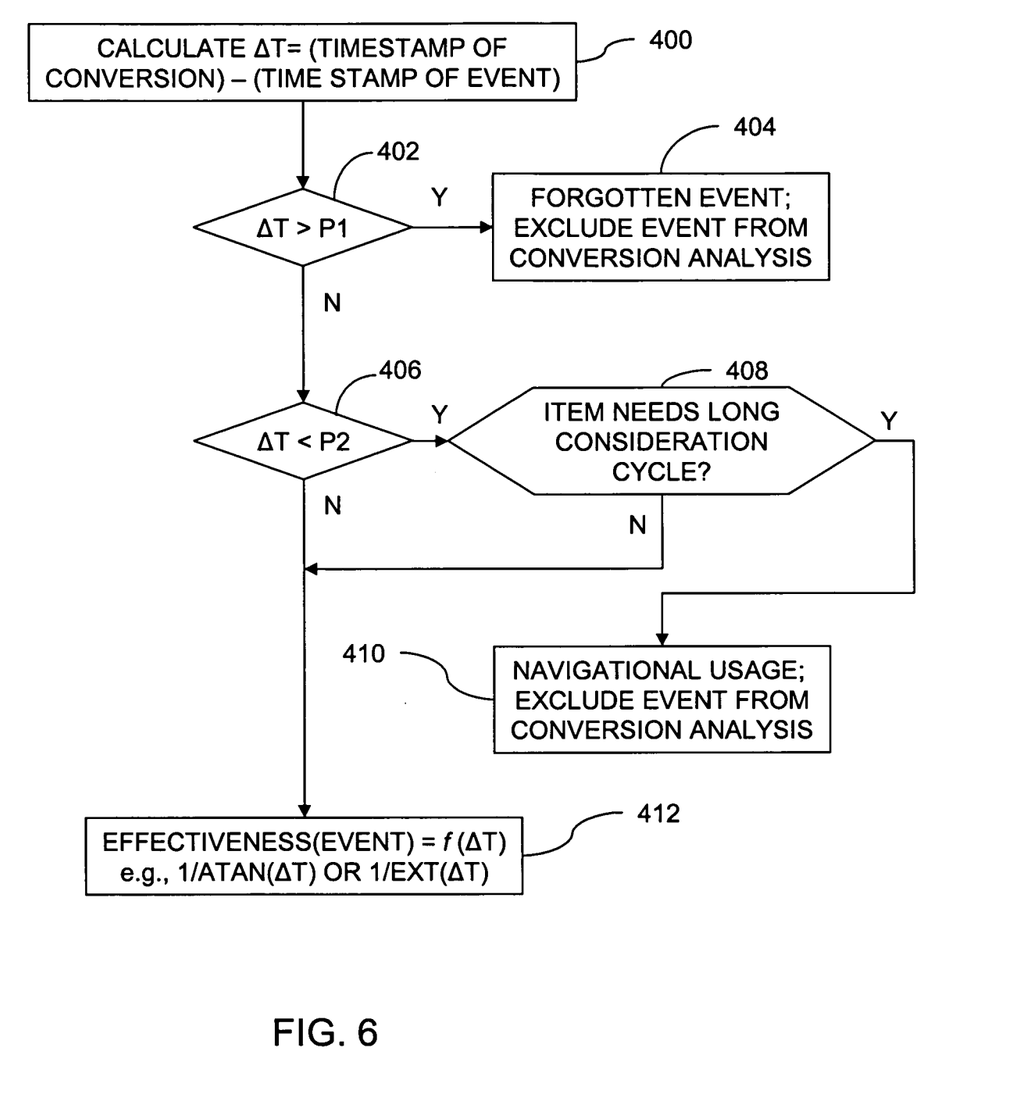
FIG. 6 is a flow chart diagram of a memory degradation and navigational usage model.

FIG. 6 is a flow chart diagram of another exemplary embodiment combining a fixed conversion window, memory decay model, and navigational usage.

At step 400, the system calculates a $\Delta T$ for each event, where:

$$\Delta T = \text{(Timestamp of Conversion)} - \text{(Timestamp of Event)}.$$

The $\Delta T$ for each event can then be used as the independent variable for the fixed conversion window, memory decay model, and navigational usage techniques.

At step 402, a determination is made whether $\Delta T$ is greater than the fixed conversion window P1. If $\Delta T$ is greater than P1, step 404 is executed. Otherwise, step 406 is executed.

At step 404, since $\Delta T$ is greater than the fixed conversion window (e.g., 14 days), it can be assumed that the user has forgotten about this particular event, and the event can be discarded or ignored in the credit attribution analysis.

At step 406, a determination is made whether $\Delta T$ is less than a navigational usage period P2. If $\Delta T<P2$, the step 408 is executed. Otherwise, step 412 is executed.

At step 408, having determined that $\Delta T$ is less than P2, a determination is made whether the product or service purchased is the item needs a long consideration cycle (e.g., a high-cost or "big-ticket" item). If this is a long consideration cycle item, then step 410 is executed. Otherwise, step 412 is executed.

At step 410, since $\Delta T$ is less than P2, and this is a long consideration cycle item, the event is considered a navigational usage, and the event is not considered to have influenced the purchase decision. The event can be discarded.

At step 412, since $\Delta T$ is between P2 and P1, the event is considered to have a non-zero influence on the purchase decision. The memory decay function value $f(\Delta T)$ is determined, to provide an effective count value for the event.

In alternative embodiments, the navigational usage period P2 may be a function of the product or service being ordered. P2 values may be stored in a table for each type of product or service. Alternatively, P2 may vary with the price of the product or service, so that products with relatively high prices have relatively high values of P2, and products with relatively low prices have relatively low (or zero) values of P2. If P2 is a function of product or price, then step can be omitted from the embodiment of FIG. 6. Instead, a determination of whether to treat the event as a navigational usage can be made by merely comparing $\Delta T$ to the value of P2 for that type of product or service.

Although one example of a long-consideration-cycle item is described above (a high cost item), items may be deemed long-consideration-cycle items for many other reasons, such as perceived difficulty of use, danger of use, or other reason.

Although the example of FIG. 6 combines a fixed conversion window, a memory decay model, and navigational usage model, any of these models may be used individually without the other two, or any combination using two of the three may be used.

Several conversion attribution methods are described above to model the relationship between ad events and conversions. The simplest method, AIM, is based on a linear relationship together with several assumptions. Various methods may be used to relax the assumptions, including Hidden Events, Ad Saturation, Ad Synergy, Memory Degradation, and Navigational Usage.

Although online banner ads are used as examples to illustrate the methods and systems, the described methods can be applied to other media (such as Cable TV, Newspaper, and the like) and other online ad formats (such as email ads, streaming ads, text links, and the like), as long as events and conversions can be tracked individually.

The ability to attribute credit for conversions can improve advertisers' profitability. Once the credit for conversions is attributed to each individual line, one can determine the conversion rate (defined as "number of conversions/number of ad impressions") of each line. Given the conversion rate and the cost per impression, one can compute the return on investment (ROI, defined as "conversions per ad dollar") for each line. Given the ROI for each line, an advertiser can optimize an ad campaign by shifting advertising dollars from low-ROI lines to high-ROI lines.

Further, the technology described above can be directly applied to attribution of continuous credits, such as revenue, as opposed to merely tracking conversions. For example, once the conversions are attributed to the various ad lines, the ensuing revenue stream for each ad line can also be attributed. For example, all revenue for a product can be attributed to the various ad lines in proportion to the fractional credit attributed to each ad line. Thus, it is possible to determine the ROI in more familiar terms of revenue per ad dollar.

One of ordinary skill in the art can readily construct a system for implementing the method described above. For example, in an online advertising system, the event occurrence and conversion data may be conveniently collected by the web server that delivers the advertisements to each of the users. The tracked data may be stored in any convenient computer readable medium to which the server can write data, preferably a non-volatiles storage medium, to provide persistence of data in the event of a server outage.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, ZIP™ disks, memory sticks, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. The appended claims should be construed broadly, to include other variants and embodiments of the invention, which may be made by those skilled in the art.

What is claimed:

1. A method of attributing credit for conversions to a plurality of event types, comprising the steps of:
   (a) defining a first plurality of probabilities that a single impression of each of a plurality of respective event types causes a conversion by one of a first subset of a plurality of users, each of whom is exposed to only one type of event;
   (b) defining a second plurality of probabilities that a single impression of each of the plurality of respective event types causes a conversion by one of a second subset of the plurality users, each of whom is exposed to at least two types of events, the second plurality of probabilities reflecting synergy between at least two of the event types;
   (c) tracking impressions from the first and second subset of plurality of users;
   (d) tracking, for the impressions, the event types and conversions by the plurality of users; and
   (e) using a programmed processor to calculate values for the first and the second plurality of probabilities based on the tracked impressions and conversions.

2. The method of claim 1, wherein the second subset of probabilities are only defined for pairs of event types that have at least a threshold correlation between them.

3. A method of attributing credit for conversions to a plurality of event types comprising the steps of:
   (a) estimating a set of values for a probability that a single impression of each of a plurality of event types causes a conversion by a given one of a plurality of users;
   (b) apportioning event credit for each respective event type to each respective user based on a fraction of the total events for that user corresponding to each event type and the estimated value corresponding to that event type;
   (c) normalizing the apportioned event credits to form a revised set of values; and
   (d) repeating steps (b) and (c) until a change between successive revised sets of values satisfies a convergence criterion;
   wherein at least one of the steps (a), (b), (c), or (d) is performed by a processor.

4. The method of claim 3, wherein the normalization utilizes a saturation factor for reducing apportioned event credits as saturation is approached.

5. A non-transitory computer readable medium encoded with computer program code, wherein, when the computer program code is executed by a processor, the processor performs a method of attributing credit for conversions to a plurality of event types, comprising the steps of:
   (a) defining sets of values, each set of values defining a plurality of probabilities that a single impression of each of a plurality of respective event types causes a conversion by one of a plurality of users, wherein each event type is associated with a probability that the impression for that event type causes the conversion;
   (b) calculating a respective total squared error corresponding to each set of values, each total squared error being based on differences between an observed outcome for each user and a respective expected outcome for each user calculated from the respective set of values, wherein the expected outcome is modified with a saturation function to reduce an expected probability for a particular event as saturation is approached; and
   (c) selecting one of the sets of values so as to minimize the total squared error.

6. The computer readable medium of claim 5, wherein the event types include at least one hidden event type corresponding to inputs that are not tracked, to which a user is exposed.

7. The computer readable medium of claim 5, wherein a number of impressions of each event type are limited to effective impressions by utilizing a saturation factor that is multiplied by the number of impressions.

8. The computer readable medium of claim 5, wherein observed events are only considered in calculating the expected outcome if the events occurred within a first given period of time before a conversion occurs.

9. The computer readable medium of claim 5, wherein observed events are only considered in calculating the expected outcome if the events occurred at least a second given period of time before a conversion occurs.

10. The computer readable medium of claim 5, wherein the method further comprises assigning at least one of the events a reduced effectiveness factor based on a length of time between respective events and the respective conversions associated therewith, such that events which occurred longer before the conversion have a lower effectiveness than events which occur closer to the conversion.

11. A non-transitory computer readable medium encoded with computer program code, wherein, when the computer program code is executed by a processor, the processor performs a method of attributing credit for conversions to a plurality of event types, comprising the steps of:
   (a) estimating a set of values for a probability that a single impression of each of a plurality of event types causes a conversion by a given one of a plurality of users;
   (b) apportioning event credit for each respective event type to each respective user based on a fraction of the total events for that user corresponding to each event type and the estimated value corresponding to that event type; and
   (c) normalizing the apportioned event credits to form a revised set of values, wherein the normalization includes reducing credits for navigational usage when the events correspond to advertisements for products or services for which there is a high probability that such events or services are only purchased after prolonged consideration.

* * * * *